United States Patent [19]

Enos

[11] 4,280,047
[45] Jul. 21, 1981

[54] NUCLEAR IMAGING PHANTOM

[76] Inventor: Gary Enos, 12 Clintonville Rd., Northford, Conn. 06472

[21] Appl. No.: 47,366

[22] Filed: Jun. 11, 1979

[51] Int. Cl.³ ............................................ G01D 18/00
[52] U.S. Cl. .................................................. 250/252
[58] Field of Search .............. 250/252, 510, 505, 320, 250/321; 35/17

[56] References Cited

U.S. PATENT DOCUMENTS

| | | | |
|---|---|---|---|
| 1,953,249 | 4/1934 | Michel | 250/510 |
| 3,348,319 | 10/1967 | Harrison | 250/320 |
| 4,014,109 | 3/1977 | Schramm | 35/17 |
| 4,126,789 | 11/1978 | Vogl et al. | 250/505 |

OTHER PUBLICATIONS

Rollo, F. D., "Techniques for Evaluating Imaging Devices", reprinted by *Applied Radiology*, May/Jun. 1976.

*Primary Examiner*—Alfred E. Smith
*Assistant Examiner*—Janice A. Howell
*Attorney, Agent, or Firm*—Wells, St. John & Roberts

[57] ABSTRACT

A phantom for evaluating resolution of a nuclear imaging system has the form of a rectangular sealed container filled with liquid to simulate clinical scattering. The container surrounds five interior steps extending across its width in a linear depth progression. Identical groupings of lead disks are placed on each step. Each grouping includes several subgroups of disks arranged across the step in a linear progression of width sizes and spacings.

11 Claims, 5 Drawing Figures

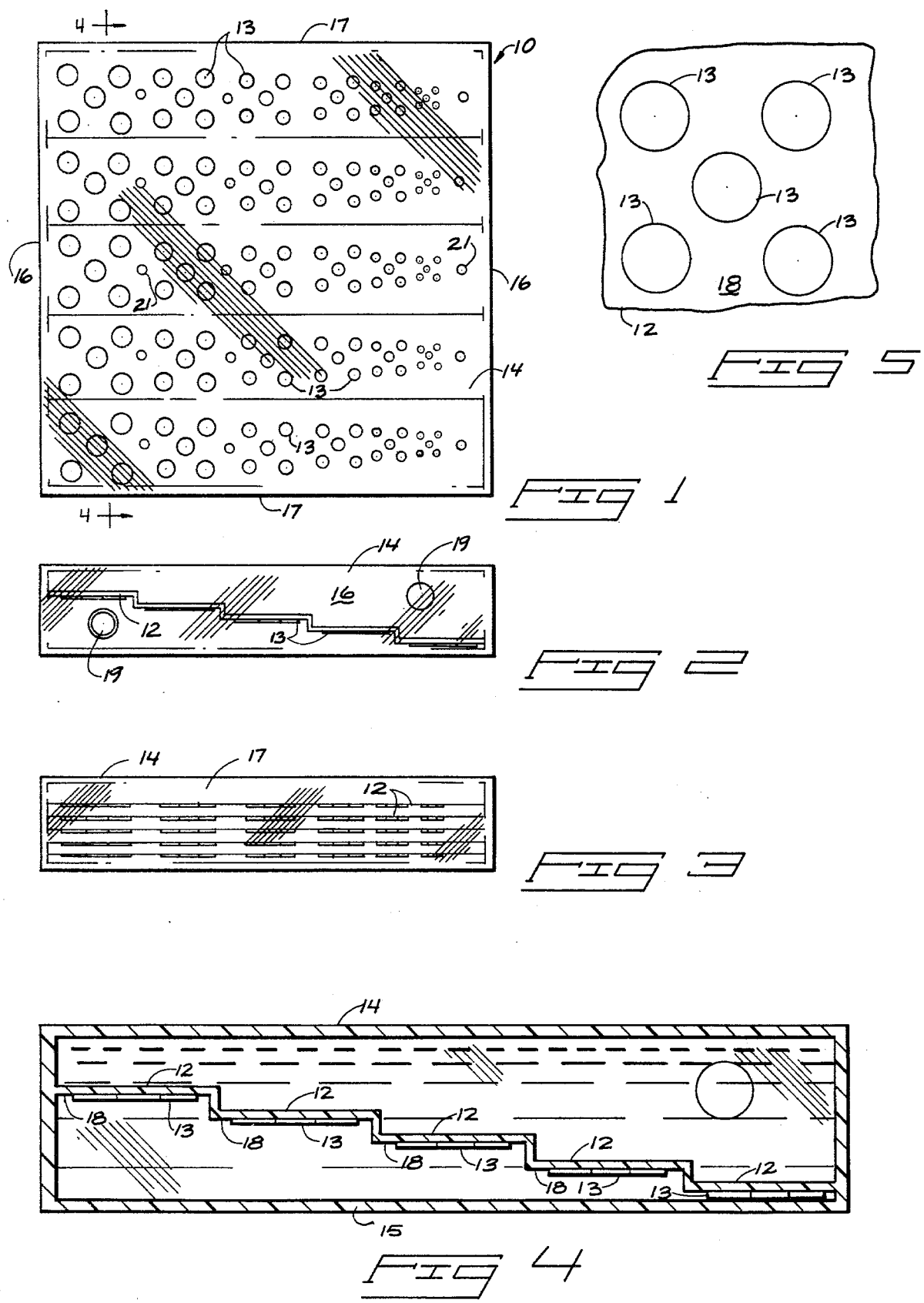

NUCLEAR IMAGING PHANTOM

BACKGROUND OF THE INVENTION

This invention relates generally to test devices for nuclear imaging systems, such as Anger camera systems used in radiology.

There are a multitude of methods available for evaluation of camera performance in nuclear imaging systems. These methods evaluate a number of parameters including uniformity, linearity (X and Y), spatial resolution, count efficiency, and image distortion. In the majority of cases, these evaluations are made under other than clinical conditions.

The more common use of phantoms constructed utilizing lead bars or holes drilled in lead (standard bar phantoms, Smith orthagonal hole phantoms) provide high input contrast to the detector assemblies. These methods commonly use ¼ in. (0.635 cm) thick lead representing 28 half value layers for 140 kev photons, or ¼ in. (0.635 cm) powdered tungsten representing 32 half value layers for 140 kev photons. Although the fidelity increases as bar width and interspacing decreases, the lack of a scattering media and the presentation to the detector of a high contrast input, tend to represent other than the clinical problem (namely, the detection of a focal void within an activity distribution).

Line spread function measurements made with line sources placed in air or scattering media, are difficult to perform and do not reflect the clinical problem. The most popular technique involving determination of the width of the curve at half the maximum value (FWHM), does not reflect the effect of scattering medium as deterioration of image quality due to this clinical problem rarely is seen above the 50% level in this measurement.

Results of a modulation transfer function measurement yields data relating primarily to the spatial resolution performance on a sinusoidal distribution of radioactivity. Again, the modulation transfer function is difficult to perform, and the data does not reflect the response of the imaging device to the detector of voids under clinical parameters.

Contrast efficiency can be evaluated by utilizing the Rollo phantom. This phantom contains an inner core that has 16 interconnecting cells. The cells are filled with a radioactive solution. Four different sphere diameters at four different contrast levels are imaged within the scattering media. Images of the phantom obtained on different collimators for equal data accumulation times will reflect trade-offs between contrast efficiency and sensitivity offered by each collimator type. The principal disadvantage of the Rollo phantom is that it only offers evaluation of the central portion of the imaging device, unless multiple images across the detector assembly are obtained. The evaluations of linearity and image distortion over the entire detector assembly is not easily appreciated.

With the preceding information in mind, I have developed a phantom which evaluates the total system camera performance under clinical parameters. It allows for the subjective evaluation of spatial resolution and contrast efficiency with respect to depth and various target to background ratios in the presence of a scattering medium. In the interest of maximizing the output contrast visibility of low input contrast lesions by the photographic system, the utility of the phantom described is discussed.

The intrinsic spatial resolution specifications provided by camera system manufacturers usually reflect the most favorable experimental circumstances. Intrinsically, current models of Anger camera systems are capable of resolving high contrast objects separated by 2.5 to 3.0 mm. in the energy region of 140 kev. With hopes of providing a more practical evaluation of system resolution, the phantom described herein was designed to simulate clinical parameters. The phantom permits the subjective evaluation of spatial resolution at depths, in the presence of scattering medium and varied input contrast.

DESCRIPTION OF THE DRAWINGS

FIG. 1 is a top plan view of the phantom;

FIG. 2 is a side elevation;

FIG. 3 is a bottom end elevation;

FIG. 4 is an enlarged section taken along line 4—4 in FIG. 1; and

FIG. 5 is a schematic view showing disk subgroup geometry.

DESCRIPTION OF THE PREFERRED EMBODIMENT

The phantom essentially comprises a closed container 10 filled with liquid 11 that serves as a scattering medium. A series of parallel steps 12 are fixed within the container. Steps 12 present individual planar surfaces progressively spaced from the top and bottom walls 14, 15 of the container and arranged side-by-side within the surrounding liquid 11 in a direction that is perpendicular to their respective lengths. A plurality of identical groupings of discrete geometrical attenuation objects 13 are arranged along the respective planar surfaces of steps 12. The resulting structural geometry and proper choice of materials permits the phantom to simulate clinical conditions of relatively low object contrasts for evaluation of camera performance in a nuclear imaging system.

Container 10 is illustrated as being rectangular in shape, and is preferably dimensioned so as to substantially cover the area of the imaging device being evaluated. The container 10 includes a top wall 14 and a parallel bottom wall 15 which are uniformly spaced and parallel to one another. They overlie one another and have respective side and end edges in vertical registration. They are interconnected by rectangular vertical side walls 16 and end walls 17. While container 10 is illustrated as fabricated from flat sheets of material, it might alternately be molded as a lesser number of elements, using conventional molding and design techniques.

The walls about container 10 are made of radiolucent material. One suitable example is "Lucite" (trademark) methyl methacrylate ester polymers. Other equivalent materials may be substituted. The material chosen for container 10 can be either visably transparent, translucent or opaque.

As shown, one side wall 16 includes a pair of threaded filling ports 19, which are used for purposes of either emptying or adding liquid to the interior of container 10. The two ports 19 are located at opposite sides of the steps 12 which form an intermediate partition through the interior of container 10.

The liquid 11 completely fills the interior of container 10 to simulate clinical scattering. It can be pure water, or might be a solution of water and dissolved organic or inorganic materials, depending upon the amount of scattering desired. To further reduce contrast, a quantity of Technetium can be added to the water within the phantom. Other radioactive materials can be utilized, as will be required by those skilled in this field.

The steps 12 located within container 10 are identical to one another in both physical structure and surface configuration. Steps 12 are in the form of rectangular sheets of equal thickness, each presenting a planar surface 18 facing toward the bottom wall 15 of the container 10. The planar surfaces 18 are arranged in parallel planes spaced in a linear progression from the opposed walls 14, 15 above and below them. This spatial progression increases or decreases from one end of container 10 to the other. The steps 12 include apertures 21 formed through them to assist in filling container 10 or emptying it, by providing open communication to both sides of the partition presented by the steps 12.

Each step 12 has a grouping of discrete geometrical attenuation objects or disks 13 arranged along its planar surface 18. The disks 13 can be secured to the steps 12 by adhesive or by any suitable mechanical system that does not interfere with the intended use of the phantom. As an example, the disks might be made from lead sheets. The grouping of disks along each step 12 includes several subgroups of disks arranged geometrically as shown in FIG. 5. Each subgroup includes four disks having centers at the corners of a square, the sides of the square being twice the disc diameter. The corner disks are therefore separated by a distance equal to their individual diameters. A fifth disk, centered within the square, is separated from each of the corner disks by a distance equal to one half the disk diameter. The basic geometry of each subgroup therefore comprises a triangle within the square pattern, including two adjacent corner disks and the center disk. The three disks are arranged with their respective centers at the corner of a 45° right triangle having a base (between the centers of the corner disks) equal to twice the disk diameter.

Steps 12 are illustrated as being constructed from rectangular sheets of equal thickness. They might be molded as an integral unit, either separately from the walls of container 10 or as part of a molded container structure.

The disks 13 are constructed from sheet metal or other suitable attenuation material of common thickness and have parallel upper and lower surfaces arranged in planes that are parallel to the planar surfaces 18 of the respective steps 12. Each grouping of disks 13 includes a plurality of subgroups of individual disks in a linear progression of disk width sizes and spacings located identically along the lengths of the respective steps. As illustrated in FIG. 1 each step 12 supports six subgroups of disks 13 progressively decreasing in both disk diameter and disk spacings from the left side of the phantom to its right side. In the preferred progression, the size differential between the disk diameters of the adjacent subgroups is equal to the minimum disk diameter included within the grouping of disks 13 across each step 12. In other words, the difference between the diameters of the disks in adjacent subgroups will be equal to the disk diameter in the subgroup having the smallest disk diameter. The subgroups of five disks are geometrically patterned so as to evaluate spatial resolution.

The phantom, filled with water to simulate clinical scattering, was constructed of 0.635 cm. thick Lucite (Trademark), plastic sheet material and measures 32.4×32.4×7.62 cm. Lead discs, 0.79 mm. thick, were placed on five steps within the phantom at depths of 0.0 through 4.0 cm. (3.0 to 7.0 cm. when the phantom is inverted). Each step displays the disks grouped in 3.2 mm. increasing diameters, from 3.2 mm. to 19.0 mm. Each group of five equally sized disks is patterned to evaluate spatial resolution. Each disk represents three half value layers of attenuation per 140 kev photons, a condition providing an initial object contrast of 0.875. With the addition of water to the phantom and the use of a transmission source, the effects of scattering medium and poor geometry reduce this value to 0.5. With the addition of a known quantity of Technetium to the water within the phantom, the object contrasts can be reduced as desired.

Testing of the phantom was limited to those Anger camera systems specifying an intrinsic resolution of 3.2 mm. or better. Comparable 3,000 counts per square cm. ID images were obtained at 15% windows for 140 kev photons on camera systems equipped with ultrafine high resolution, low energy collimators. Count rates at which phantom images were obtained, did not exceed 6–7,000 counts per second (most clinical images are taken at a rate of 1–10,000 counts per second). Two sets of images were obtained utilizing "Polaroid" (Trademark) 084 film on each camera system representing object contrasts of 0.5 and 0.25. When uniformity correction programs were a part of the system, images were obtained with the units both on and off.

Utilizing the phantom, adjustments were made on dot brightness and F stop settings to assure proper exposure levels. The effects of minor adjustments on maximizing output contrast levels are easily appreciated with the phantom described. The resulting images can be evaluated subjectively for minimum resolution at maximum depth (minimum resolution distance) for both contrast ranges and for apparent image distortion and linearity.

As constructed this phantom is capable of evaluating Anger camera system resolution under the following parameters: (1) Scattering media representing 7.5 cm. of tissue attenuation and scatter, (2) Spatial resolution at depths of 0–4 cm (3–7 cm. when phantom is inverted).

The phantom described simulates clinical conditions in the evaluation of total gamma camera system performance. The phantom is large enough to evaluate the entire field of view of large field of view Anger systems, and although the subjective evaluation of more commonly used phantoms revealed little apparent differences, the utilization of the phantom described shows the presence or absence of linearity problems and image distortion as well as resolution changes effected by contrast, depth and scatter. In addition, the phantom is valuable in generating optimal contrast for lesion definition.

Various modifications might be made in the fabrication or construction of the phantom, depending upon the structural echniques and materials chosen for a particular product design. For these reasons, only the following claims are set out as definitions of the disclosed invention.

Having described my invention, I claim:

1. A phantom for evaluation of nuclear imaging systems, comprising:

a closed container of radiolucent material;

a liquid filling said container, said liquid serving as a scattering medium;

a plurality of parallel steps made of radiolucent material and fixed within the container, the steps presenting individual planar surfaces progressively spaced from a first wall of the container and arranged side-by-side within the liquid in a direction that is perpendicular to their respective lengths;

and a plurality of identical groupings of discrete geometrical attenuation objects arranged along the respective planar surfaces of said steps said objects having a common thickness between oppositely facing parallel surfaces arranged in planes parallel to the planar surfaces of the respective steps;

each grouping comprising a plurality of objects having a progression of object size and spacing between adjacent objects.

2. A phantom as set out in claim 1 wherein the separation between the first wall of the container and the plane surfaces of the steps progressively spaced therefrom varies linearly from one side of the steps to the other.

3. A phantom as set out in claim 1 wherein the steps are in the form of rectangular sheets of equal thickness.

4. A phantom as set out in claim 1 wherein the container comprises first and second identical parallel walls overlying one another;

said steps being in the form of rectangular sheets of equal thickness.

5. A phantom as set out in claim 1 wherein each grouping comprises:

a plurality of subgroups of individual disks in a linear progression of disk width sizes and spacings located identically along the lengths of the respective steps.

6. A phantom as set out in claim 1 wherein said objects comprise circular disks.

7. A phantom as set out in claim 1 wherein said objects comprise circular disks;

each grouping comprising a plurality of subgroups of individual disks in a linear progression of disk width sizes and spacings located identically along the lengths of the respective steps;

each subgroup comprising at least three disks arranged with their respective centers at the corners of a 45° right triangle having a base equal to twice the disk diameter.

8. A phantom as set out in claim 1 wherein said objects comprise circular disks;

each grouping comprising a plurality of subgroups of individual disks in a linear progression of disk width sizes and spacings located identically along the lengths of the respective steps;

each subgroup comprising at least three disks arranged with their respective centers at the corners of a 45° right triangle having a base equal to twice the disk diameter;

the size differential between the disk diameters of adjacent subgroups being equal to the minimum disk diameter within the groupings.

9. A phantom for evaluation of nuclear imaging systems, comprising:

a closed container of radiolucent material;

a liquid filling said container, said liquid serving as a scattering medium;

a stepped wall fixed across the interior of the container and including a plurality of planar step surfaces parallel to one another and spaced in a linear progression from opposite walls of the container;

and an identical grouping of circular disks arranged along each of the step surfaces, the disks being made from attenuation material having low object contrast relative to the scattering medium;

said disks having a common thickness and being arranged within a plurality of subgroups located identically along each step surface, the subgroups each containing a plurality of identical disks spaced from one another, the subgroups presenting a linear progression of disk diameters and spacings between adjacent disks in each subgroup from one end of each step surface to its remaining end.

10. A phantom as set out in claim 9 wherein each step surface is formed along a rectangular sheet of common thickness bounded at opposite sides by the scattering medium.

11. A phantom as set out in claim 9 wherein each subgroup comprises:

at least three disks arranged with their respective centers at the corners of a 45° right triangle having a base equal to twice the disk diameter.

* * * * *